(12) United States Patent
Li et al.

(10) Patent No.: US 12,222,443 B2
(45) Date of Patent: Feb. 11, 2025

(54) OPTICAL COVER FOR DETECTION DEVICE

(71) Applicant: AGC GLASS EUROPE, Louvain-la-Neuve (BE)

(72) Inventors: Meijie Li, Louvain-la-Neuve (BE); Yannick Sartenaer, Vedrin (BE); Quentin Fraselle, Mont Saint Guibert (BE); Thomas Lambricht, Perwez (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 993 days.

(21) Appl. No.: 17/278,948

(22) PCT Filed: Sep. 25, 2019

(86) PCT No.: PCT/EP2019/075795
§ 371 (c)(1),
(2) Date: Mar. 23, 2021

(87) PCT Pub. No.: WO2020/064794
PCT Pub. Date: Apr. 2, 2020

(65) Prior Publication Data
US 2022/0050181 A1    Feb. 17, 2022

(30) Foreign Application Priority Data
Sep. 26, 2018   (EP) .................................. 18197023

(51) Int. Cl.
*G01S 7/00* (2006.01)
*G01S 7/481* (2006.01)
(Continued)

(52) U.S. Cl.
CPC ............ *G01S 7/4813* (2013.01); *G01S 7/497* (2013.01); *G01S 17/10* (2013.01)

(58) Field of Classification Search
USPC ......................................................... 356/4.01
See application file for complete search history.

(56) References Cited

U.S. PATENT DOCUMENTS 9,322,901 B2 *   4/2016   Kerness .................. G01S 17/58
9,476,706 B2 *  10/2016   Nakajima ............. B60W 30/16
(Continued)

FOREIGN PATENT DOCUMENTS

EP          3 255 456 A1     12/2017
WO     WO 2016/198228 A1    12/2016

OTHER PUBLICATIONS

International Search Report issued on Dec. 11, 2019 in PCT/EP2019/075795 filed on Sep. 25, 2019.

*Primary Examiner* — James R Hulka
(74) *Attorney, Agent, or Firm* — Oblon, McClelland, Maier & Neustadt, L.L.P.

(57) ABSTRACT

A detection device with an optical device comprising at least one light source and at least one light sensitive element optically decoupled inside the detection device. A protective housing encloses the optical device. An optical cover comprising an internal surface facing the optical device and an external surface opposite to the internal surface, wherein the optical cover is transparent at the operating wavelength of the optical device, and comprises at least two separate apertures. A first aperture faces the light source and a second aperture faces the light sensitive element. The optical cover is one piece comprised of diffusing, absorbing, multilayer elements, and/or wavelength-changing elements placed between the first and second apertures in an optical decoupling zone outside the field of view of the light source and the sensitive element to avoid the stray light travelling from the light source to the sensitive element within the optical cover.

14 Claims, 4 Drawing Sheets

(51) Int. Cl.
    *G01S 7/497*         (2006.01)
    *G01S 17/10*        (2020.01)

(56) References Cited

U.S. PATENT DOCUMENTS

| | | | |
|---|---|---|---|
| 10,422,876 B2 * | 9/2019 | Wang | G01V 8/12 |
| 11,448,730 B2 * | 9/2022 | Etschmaier | G01S 7/497 |
| 2014/0231635 A1 | 8/2014 | Kerness et al. | |
| 2015/0029487 A1 | 1/2015 | Nakajima et al. | |
| 2018/0224546 A1 | 8/2018 | Wang | |
| 2019/0146069 A1 | 5/2019 | Etschmaier et al. | |

\* cited by examiner

OPTICAL COVER FOR DETECTION DEVICE

The invention relates to an optical device operating with electromagnetic waves comprising an optical sensing device and a protective housing enclosing said sensing device. Said protective housing comprises at least one optical cover facing the optical device and being transparent at the operating wavelength of the said optical device.

More particularly, the present invention relates to a LiDAR as optical device enclosed in a protective housing comprising at least one optical cover facing the optical device and being transparent at the operating wavelength of the said optical device.

Optical devices, such as light sources and optical sensors, operate with electromagnetic waves. These kind of devices are widely used in various areas, including manufacturing, automotive, electronics, military and daily life. For most of these applications, optical covers are needed to protect the optical devices, to implement aesthetical considerations, and/or even to implement some optical functions.

The optical cover may be made of glass, plastic and/or other materials and may have many shapes. The optical cover may be flat or bent. The optical cover has one internal surface facing internally the optical device and one surface in contact opposite to the internal surface generally in contact with external environment. Most of the times, these two surfaces are parallel to each other. Therefore, the optical cover may become unfortunately a waveguide for electromagnetic waves generating stray light in the assembly.

For many of optical devices, this wave guiding effect should be limited or even avoided, in order to achieve optimal performance of the optical device. It is the case for example, for a LiDAR device that emits laser light from a light source element to the detected target, and receives the reflected laser light from the target by a light detection element.

In order to avoid unexpected wave guiding effect inside the optical cover, it is common to use separate optical apertures. For example, in the case of Lidar as optical device known from the prior art, two separate optical covers may be used, the first optical cover covering the light source element (dedicated to the emission) and the second optical device covering the detection element (dedicated to the reflection). Thus, the light source emits Infra-red (IR) light through the optical cover to the target and the reflected back light travels through the second optical cover to the detection element. The two optical covers are separated physically from each other, in order to block unexpected light.

However, the use of separate optical covers has the following disadvantages:
 increase of the cost of the optical cover itself. Additional cost for cutting and edge finishing is always needed. For optical covers with additional functions, e.g. automotive glazing with heating wires, the cost is almost doubled to have two functional heating systems. Sometimes it challenges the fabrication facility to produce smaller pieces, like more precise alignment, more careful design of additional functions, which is also a source of additional cost.
 increase of the complexity and cost for the housing of the optical device. The housing has to be designed to hold each optical cover separately with sufficient mechanical resistance, and the assembly becomes more complicated and demanding.
 decrease mechanical resistance, humidity resistance and/or chemical resistance for the whole packaging.
 limitation of the applications. For automotive applications, like windshields, backlites, sidelites and sunroofs, it is preferred to have one piece of glazing or plastic as optical cover.
 in some cases, for example when the optical device is provided on a vehicle's windshield, it is difficult to maintain the clarity of the optical cover. Wipers which are widely used to clean automotive glazing like windshield are not enough efficient when the combines separate optical covers and housing because it is not smooth enough for wipes to function efficiently.
 it is mostly not favored by taking aesthetics into considerations.

It is known from the prior art, optical cover protecting the optical device and more particularly a LiDAR device made in two pieces in order to avoid the issues cited above. The part of the emitted light can be guided though the optical cover directly to the detection unit, without interacting with the target. Thus, this part of light can either generate noises or become false signals for the LiDAR device, which should be reduced as much as possible. Some other examples may be cited requiring that different optical units within one optical device have to be optically isolated from one another, like display systems with three RGB light sources, detection arrays with multiple detection zones and so on.

Thus, the present invention proposes a solution to reduce or eliminate unexpected guided electromagnetic waves within optical covers for optical devices.

The present invention proposes a solution to reduce or eliminate unexpected guided electromagnetic waves within optical cover for optical devices wherein the optical cover is made in one piece of optical cover provided with multiple virtually separate optical apertures for required wavelengths.

Thus, the present invention concerns a detection device comprising:
 a. an optical device comprising at least one light source and at least one light detection element which are optically decoupled inside the detection device;
 b. a protective housing enclosing said optical device, and comprising an optical cover having one internal surface facing the optical device and an external surface opposite to the internal surface,
  (i) the optical cover being transparent at the operating wavelength of the said optical device,
  (ii) the optical cover comprising at least 2 separate apertures, a first aperture facing the light source and a second aperture facing the light sensitive element.

According to the present invention, the optical cover is made in one single piece provided with diffusing, absorbing, multilayer elements, and/or wavelength-changing elements or a combination thereof, placed outside the field of view of the light source and the sensitive element in a way to avoid the stray light travelling from the light source to the light sensitive element within the optical cover.

The present invention proposes a solution to reduce or eliminate unexpected guided electromagnetic waves within optical covers for optical devices, so that one piece of optical cover can provide multiple virtually separate optical apertures for certain wavelengths. These solutions include using diffusing, absorbing, multilayer elements, and/or wavelength-changing elements as described below.

According to the present invention, the optical apertures have to been understood as zones facing the light source element and the light sensitive element fields of view and being transparent at the operating wavelength of the said optical device According to an embodiment of the present invention, diffusing, absorbing, multilayer elements, and/or wavelength-changing elements or a combination thereof are placed outside the field of view (FOV) of the light source and the sensitive element in a way to avoid the stray light travelling from the light source to the light sensitive element within the optical cover.

The stray light is light in the optical cover which was not intended in the detection device. The light may be from the intended source, but follow paths other than intended, or it may be from a source other than the intended source. This light will often set a working limit on the dynamic range of the system; it limits the signal-to-noise ratio or contrast ratio, by limiting how dark the system can be.

According to an embodiment of the present invention, diffusing elements can be used of both random and periodic structures to diffuse or scatter unexpected guided electromagnetic waves to other directions, so that these electromagnetic waves cannot be guided inside the optical cover anymore. These diffusing elements may include random surface microstructures, internal air bubbles, internal chemical particles, microstructure arrays, diffractive gratings, and all known diffusing elements suitable for the present invention. They can be created directly inside or on the surface of the optical cover, and can also be applied as additional elements on the optical cover. If the optical cover is a laminated glazing, diffusing elements at surface can also be placed inside the glazing, by placing them at the surfaces in touch with the interlayer. There are various techniques which can be used to generate diffusing structures, including acid etching, sand blasting, laser blasting, Ion implementation, optical lithography and so on. In glazing industry, it is also possible to create enamel diffusing patterns by enamel printing with dedicated silk screening.

According to another embodiment of the present invention, absorbing elements may be used. Absorbing elements can efficiently absorb unexpected electromagnetic waves at certain wavelengths, before they are guided from one optical aperture to another. Depending on different situations, different absorbing elements can be used. For glazing, black enamels can be used as absorbing elements, which can be printed locally on the glazing surfaces, either one side or double sides. For laminated glazing, interlayers can be altered or modified to absorb locally. In case of LiDAR using a laminated glazing as its cover, die cut technique can be used to replace the used interlayer (e.g. PVB) by a second interlayer where the optical aperture of the light source unit and the optical aperture of the detection unit need to be separated. The second interlayer should absorb the working wavelengths of the optical device as much as possible, like ITO or black PVB, for IR light of LiDAR. Alternatively, the interlayer can be prepared with a printed pattern, to have the black printed PVB as absorbing elements located between two optical apertures. For any optical cover, additional absorbing elements can be provided between two optical apertures, e.g. black silicone pad.

According to another embodiment of the present invention, multilayer elements may be used. Multilayer elements make use of multilayer coatings to be anti-reflective (AR) or highly reflective for certain wavelengths at certain angles of incidence. By having dedicated coatings locally, unexpected electromagnetic waves may be extracted out of the optical cover, so that they can not be guided from one optical aperture to another. For example, an AR coating can be placed at the external surface of the optical cover to transmit light externally, and additionally a highly reflective coating can be placed at certain places of the internal surface of the optical cover to have light reflected to the AR coated areas instead of transmitting to the optical device. These multilayer elements can be produced directly on the surface of the optical cover, or can be as additional elements attached to the optical cover.

According to another embodiment of the present invention, wavelength-changing elements may be used. Wavelength-changing elements can change the wavelength of light that should be isolated between two optical apertures to another wavelength, so that light with original wavelength is not influencing two separated apertures. These wavelength-changing effects may be introduced by fluorescence, non-linear optical effect, and other effects. These elements may be applied both on the surfaces and inside of the optical cover.

It is understood that the provided solutions above can also be combined, in order to reduce the wave guiding effects to a lager extent. For example, PVB die cut technique to have an absorbing interlayer inside the laminated glazing, can be combined with another absorbing elements as black enamels on surface, or with diffusing elements as surface microstructures created by acid etching.

According to an embodiment of the present invention, the optical cover may be provided with further diffusing, absorbing, multilayer elements, and/or wavelength-changing elements or a combination thereof, placed for example in the extremities of the optical cover.

In the present invention, it is proposed to use one piece of optical cover with virtually separate optical apertures rather than applying separate optical covers. Also taken LiDAR as an example, the optical cover can be a stand-alone LiDAR cover housed by the LiDAR housing, or it can also be a covering element extended outside the LiDAR housing.

In an embodiment of the present invention, the optical cover is flat, however, the optical cover may have other bending shapes.

In comparison with known separate optical covers used in a detection device, the use of one single optical cover with virtually separate optical apertures offers the following advantages:

- decrease of the cost of the cost of the optical cover. Additional efforts like cutting and edge finishing to have smaller pieces are not needed.
- for optical covers with additional functions, e.g. automotive glazing with heating wires, one functional heating system is sufficient. Fabrication challenges, like alignment and design of additional functions, might be reduced;
- the housing of the optical device is easier and cheaper to hold just one single piece of optical cover than more than one optical cover, and the assembly is more simple as well.
- the whole packaging can be more sealed with better humidity resistance and chemical resistance, and the mechanical resistance of the optical cover might be improved as well.
- it is the only solution, in some cases, e.g. automotive glazing, like windshields, backlites, sidelites and sunroofs, where it is required to have one piece of glazing or plastic. Because the optical cover can extend outside the device packaging, optical devices like LiDAR can be attached directly on existing covers, like automotive glazing;
- it is easier to maintain the clarity of the optical cover. For example, it is well adaptable to wiper cleaning systems when the detection device is place behind a windshield;

it is mostly favored by taking aesthetics into considerations.

According to one embodiment of the present invention, the detection device is an infrared-based remote sensing device. In a more preferred embodiment the infrared-based remote sensing device is a LIDAR sensing device Infrared-based remote sensing devices, such as LiDAR sensing devices, are technologies that measure distance to a target by illuminating that target with a pulsed laser light, and measuring the reflected pulses with a sensor. Differences in laser return times and wavelengths can then be used to make digital 3D-representations of the target. These instruments are commonly used in industrial, consumer and other applications for sensing movement, position, proximity, ambient light, speed, and direction. LiDAR sensing devices have a wide range of applications which can be of airborne and terrestrial type. Airborne LiDAR sensing devices are linked to a flying device such as plane, helicopter, drone, . . . . Terrestrial applications can be both stationary or mobile. Stationary terrestrial scanning is indeed the most common survey method. Mobile scanning is used onto a moving vehicle to collect data along a path.

LiDAR sensing devices are popularly used to make high-resolution maps, with applications in amongst others agriculture for e.g. crop mapping or to apply appropriately costly fertilizer; archeology for e.g. providing an overview of broad, continuous features that may be indistinguishable on the ground; autonomous vehicles, for e.g. obstacle detection and avoidance to navigate safely through environments; atmospheric remote sensing and meteorology; military applications; physics and astronomy e.g. to measure the position of the moon, to produce precise global topographic surveys of planets; robotics for e.g. the perception of the environment as well as object classification to enable safe landing of robotic and manned vehicles with a high degree of precision; the combination of airborne and mobile terrestrial LiDAR sensing devices for surveying and mapping, wind farm optimization to e.g. to increase the energy output from wind farms by accurately measuring wind speeds and wind turbulence, solar photovoltaic deployment for e.g. optimizing solar photovoltaic systems at the city level by determining appropriate roof tops and for determining shading losses.

In particular, in the field of autonomous vehicles, the current industry trend is to design truly autonomous cars. To approach such self-driving future, the number of sensors in vehicles will increase significantly. LiDAR sensing devices play a critical role in this development by providing the required sensory feedback from the vehicles 360° environment.

The LiDAR sensing device of the present invention (also written Lidar, LIDAR or LADAR—being the acronym of Light Detection And Ranging) is a technology that measures distance by illuminating a target with an infrared (IR) laser light, and measuring the reflected pulses with a sensor. Distance to the target is determined by recording the time between transmitted and backscattered pulses and by using the speed of light to calculate the distance traveled. It can then be used to make digital 3D-representations of the target.

LiDAR sensing devices are indeed used in very different conditions and environment. The optical cover used to protect and/or to add functionalities on and/or for aesthetic reasons, the optical device is critical for the detection device to operate at its best. They need to be more effective to have the most effective overview of the target to be measured.

Previous generations of LiDAR sensing devices were based on the emission of one to a few light pulses. In contrast, the new generation of LiDAR is of high resolution, based on the emission and reception of an array of light pulses. The new generation of LiDAR sensing devices is much more demanding in terms of optical properties and is therefore not fully compatible with conventional optical cover of a protective housing.

According to a preferred embodiment of the present invention, the optical cover is made of glass for its mechanical resistance and chemical durability to the external environment. However, it may be made of plastic which provide proper infrared transmission.

According to an embodiment of the present invention, the optical cover is made of at least one glass sheet having an absorption coefficient lower than 5 $m^{-1}$ in the wavelength range from 750 to 1650 nm provides the required high level of infrared transmission as well as the required mechanical resistance and chemical durability to a LiDAR sensing device.

According to a preferred embodiment of the present invention, the glass sheet has an absorption coefficient of the above mentioned values in the wavelength range of 750 to 1100 nm, preferably from 750 to 950 nm.

A low absorption presents an additional advantage that the final IR transmission is less impacted by the optical path in the material. It means that for large field of view (FOV) sensors with high aperture angles the intensity perceived at the various angles (in different areas are the image) will be more uniform.

Preferably, the glass sheet having a high level of near infrared radiation transmission is an extra-clear glass.

According to an advantageous embodiment of the invention, the glass sheet can be coated with at least one IR transparent absorbing (tinted) and/or reflecting coating in order to hide the un-aesthetic element of the sensor from the outside while ensuring a good level of operating performances. This coating may, for example, be composed of at least one layer of a black film or a layer of black paint having no (or very low) transmission in the visible optical range but having a high transparency in the infrared range of interest for the application. Preferably, such coating would demonstrate a transmission value in the visible optical range of maximum 15%, and a transmission value in the wavelength range from 750 to 1650 nm of at least 85%. Such paint can be made of organic compounds that can achieve transmission <5% in the 400-750 nm range and >70% in the 850-950 nm range. The coating may be provided on the external and/or internal face(s) of the cover lens, depending of its durability.

According to another embodiment of the invention, the glass sheet may be coated with a multilayer coating optimized to reflect selectively the visible range while maintaining high IR transmission. Some properties such as observed on Kromatix® product are thus sought. These properties ensure a total low IR absorbance of the complete system when such layer is deposited on adequate glass composition. The coating may be provided on the external and/or internal face(s) of the cover lens, depending of its durability.

According to another advantageous embodiment of the invention, the glass sheet is coated with at least one antireflection layer. An antireflection layer according to the invention may, for example, be a layer based on porous silica having a low refractive index or it may be composed of several layers (stack), in particular a stack of layers of dielectric material alternating layers having low and high refractive indexes and terminating in a layer having a low refractive index. Such coating may be provided on the external and/or internal face of the cover lens. A textured glass sheet may be also used. Etching or coating techniques may as well be used in order to avoid reflection. Preferably, the reflection of the treated surface would decrease from at least 1% and preferably from at least 2% if both surfaces are coated, within the concerned wavelength range.

According to another embodiment of the invention, an antireflection layer according to the invention may, for example, be a layer based on refractive index gradient layer deposited for example by ion implantation technique.

According to another embodiment of the invention, a combination of the above cited antireflection layers may be provided on the external and/or internal face of the cover lens. Preferably, the layers are deposited by PVD (soft coating). Thus, it may be possible to have a reflective coating in visible range, which also presents anti-reflective capability in infra-red (IR) range.

According to another advantageous embodiment of the invention, the glass sheet may be coupled with a heating system that allows the cover lens to quickly defrost or defog when the external operating conditions are unfavorable. Such heating system can be composed of a network of conductive wires, conductive patch or alternatively a silver-print network directly applied on the glass surface where an adequate power supply can be applied. Optionally, the system can also comprise a temperature sensor for dynamically triggering the heating function in case of need.

According to another advantageous embodiment of the invention, the glass sheet may be coated with a hydrophobic layer that prevents water droplets to aggregate onto the cover lens external surface in order to ensure proper sensor operation during rainy conditions. Such water repellant coating can be, for example, composed of thin molecular layers of fluoropolymers that reduces the surface energy and provides self-clean ability, anti-stain properties and improved moisture resistance among other effects.

Other suitable advantageous functionalities can be added to the glass sheet of the lens cover of the invention, in particular to provide supporting functions to further enhance the good operation of the LiDAR sensing device. Those supporting functions can be for example: the coupling with integrated detection functions for breakage, dirt, stain, rain, . . . or additional protection layers for preventing scratches, glare, stain, dirt, paint, . . . . Dedicated filters could also be integrated for polarization, phase or spectral discrimination.

In general, a LiDAR sensing device is an optoelectronic system which is composed of several major components: (1) at least a laser transmitter (=light source). It is preferred that the laser transmitter of the LiDAR sensing device of the present invention transmits principally in infrared wavelength from 700 nm to 1 mm, preferably in the near infrared wavelength 780 nm to 3 μm, more preferably in the wavelength range from 750 to 1650 nm; (2) at least a receiver (=light detection element) comprising a light collector (telescope or other optics). Several scanning technologies are available such dual oscillating plane mirrors, combination with polygon mirrors and dual axis scanners. Optic choices affect the angular resolution and range that can be detected. A hole mirror or a beam splitter can be used as light collectors. (3) at least a photodetector which converts the light into an electrical signal; and an electronic processing chain signal that extracts the information sought.

Two main photodetector technologies are generally used: solid state photodetectors, such as silicon avalanche photo-diodes, or photomultipliers. LiDAR sensing devices which are mounted on mobile platforms such as airplanes or satellites, may further require instrumentation to determine their absolute position and orientation and therefore further include a position and/or navigation system.

Preferably, the LiDAR sensing device to be used in the present invention, is a new generation LiDAR sensing device based on scanning, rotating.

More preferably, the LiDAR sensing device to be used in the present invention, is a new generation LiDAR sensing device based on solid state LiDAR as a flashing LiDAR. The scanning or rotating LiDARs are using moving lasers beams while flashing and solid state LiDAR emits light pulses which reflect off objects.

The protective housing can be made from any regular material known to make protective housing, such as any suitable metal material (aluminum, . . . ), plastic material (PVC, PVC coated with polyester, polypropylene HD, polyethylene . . . ) opaque and/or transparent, and combinations thereof. The housing shape will generally be linked to the shape of the LiDAR sensing device for better protection. LiDAR sensing devices can comprise several different parts that can be fixed or rotating. Common LiDAR shape refers to "mushrooms-like" devices popping up the platform where they are located.

For avoidance of doubt, visible light is defined as having wavelengths in the range of 400 to 700 nm.

According to a preferred embodiment of the present invention, the glass sheet has an absorption coefficient of the above mentioned values in the wavelength range of 750 to 1100 nm, preferably from 750 to 950 nm.

A low absorption presents an additional advantage that the final IR transmission is less impacted by the optical path in the material. It means that for large field of view (FOV) sensors with high aperture angles the intensity perceived at the various angles (in different areas are the image) will be more uniform.

According to the invention, the glass sheet is made of glass which may belong to different categories with the particularity of having an absorption coefficient lower than 5 $m^{-1}$ in the wavelength range from 750 to 1650 nm. The glass can thus be a soda-lime-silica type glass, aluminosilicate, boro-silicate, . . . .

Preferably, the glass sheet having a high level of near infrared radiation transmission is an extra-clear glass.

Preferably, the base glass composition of the invention comprises a total content expressed in weight percentages of glass:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20%. |

According to the present invention, the glass sheet of the optical cover within the protective housing, may be in the form of planar sheets or may be curved.

According to an embodiment of the present invention, the optical may extend laterally outside the protective housing.

The present invention concerns also an optical cover according to the present invention to be fixed to a protective housing for an optical device.

The invention will be For avoidance of doubt, the terms "external" and "internal" refer to the orientation of the detection device or more particularly to a detection device during installation in a vehicle.

Figure 1:
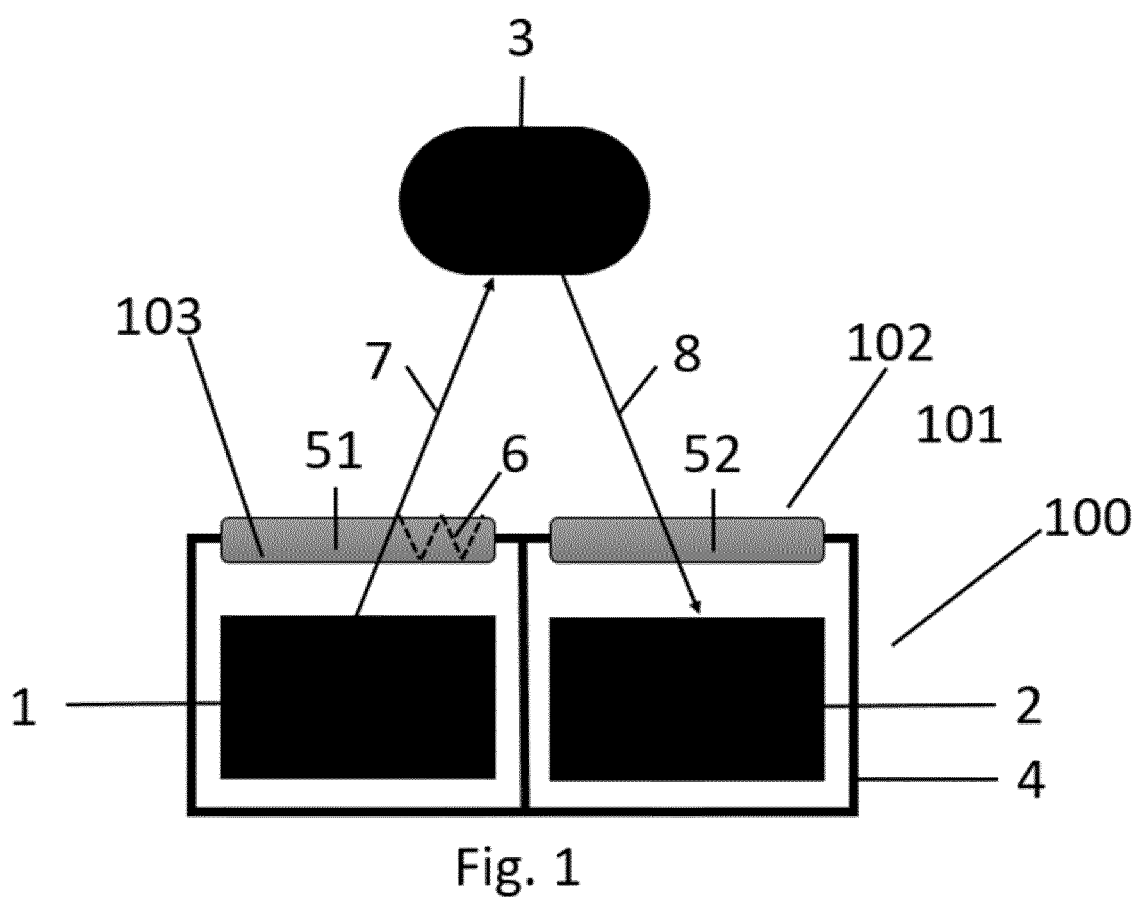
FIG. 1 is a cross view of a detection device according to prior art, with an optically transparent cover made in two pieces.

It is known from prior art, in order to avoid unexpected wave guiding effect inside the optical cover, to use separate optical apertures. FIG. 1 shows the example which uses two separate optical covers 51 and 52 for a LiDAR device as optical device, with the first one optical cover 51 covering the light source 1 and the second optical cover 52 covering the detection element 2. LiDAR is provided inside a housing 4. The working principle is that light source 1 emits infra-red (IR) light 7 through optical cover 51 to the target 3, and the reflected back light 8 travels through the optical cover 52 to the detection element 2. The two optical covers are separated physically from each other in order to block unexpected light 6.

However compared with one full piece of optical cover according to the present invention, separate optical covers have the disadvantages above as:
- increase the cost of the optical cover itself.
- increases the complexity and cost for the housing of the optical device. The housing has to be designed to hold each optical cover separately with sufficient mechanical resistance. It might reduce mechanical resistance, humidity resistance and/or chemical resistance for the whole packaging . . . .

Figure 2:
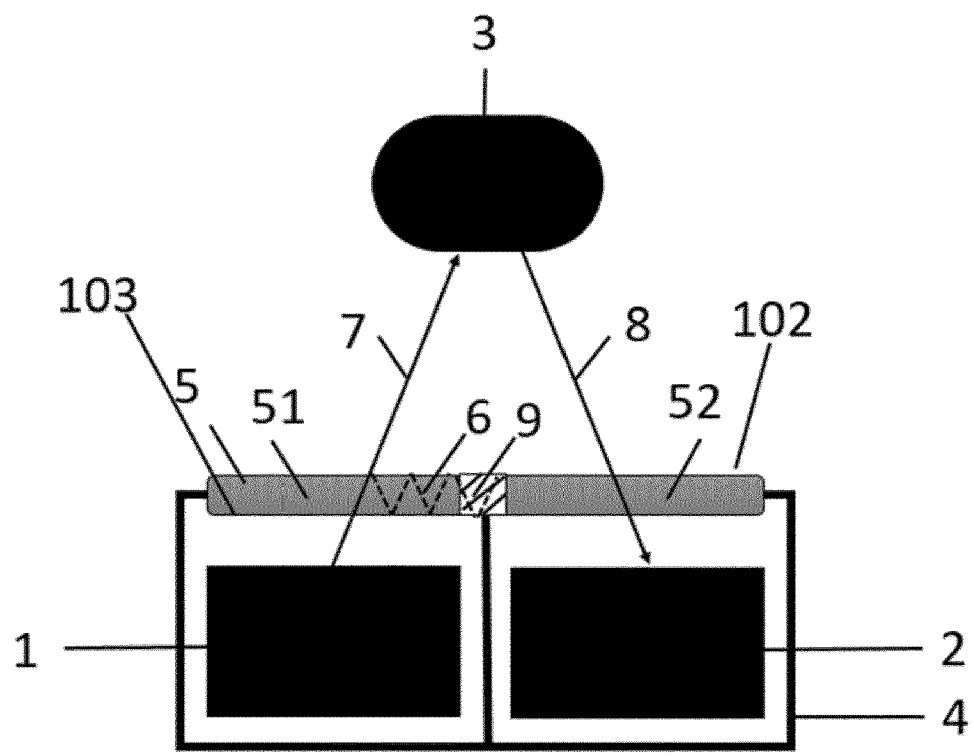
FIG. 2 is a cross view of a detection device according to the present invention, with an optically transparent cover according to the invention.

According to the present invention and described in FIG. 2, a solution based on the use of one single piece of optical cover with virtually separate optical apertures rather than applying separate optical covers. Also taken LiDAR as an example, the optical cover 5 can be a stand-alone LiDAR cover housed by the LiDAR housing 4.

Figure 3:
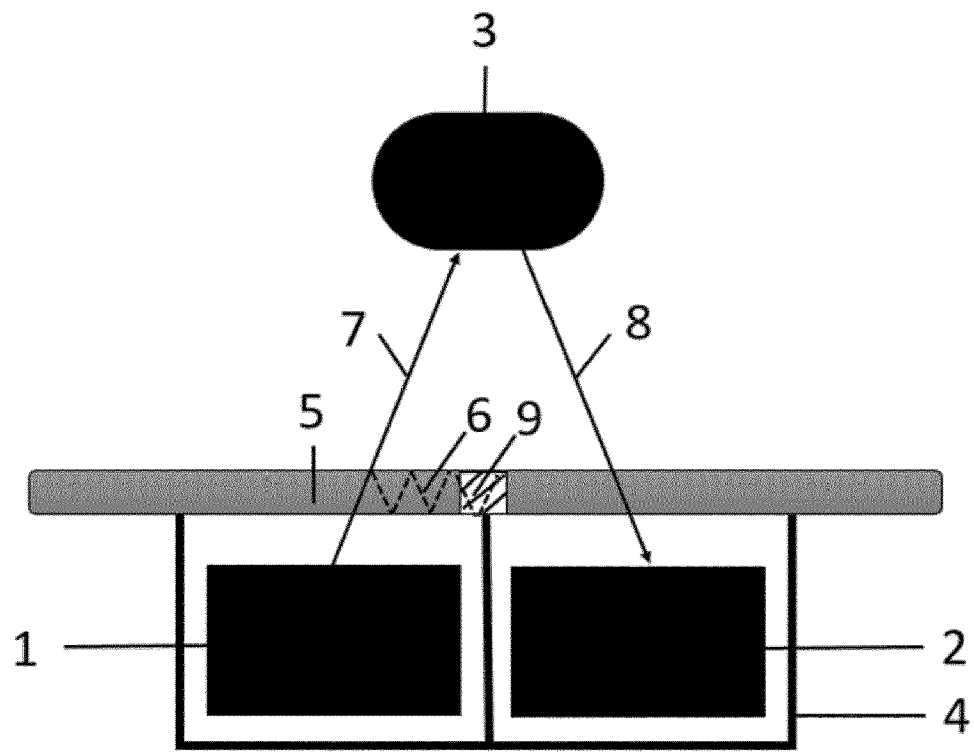
FIG. 3 is a cross view of a detection device according to the present invention, with an optically transparent cover according to the invention extended laterally outside the protective housing.

According to an embodiment of the present invention, the optical cover 5 may extended outside the LiDAR housing 4 as shown in FIG. 3.

According to the present invention, the optical cover 5 may be flat or bent. The optical decoupling zone 9 also called is a part of the optical cover 5 where guided light 6 can either be redirected or absorbed by using diffusing, absorbing and/or multilayer elements.

According to the present invention, the optical decoupling zone 9 is placed in the interface between the first 51 and the second 52 optical apertures.

It is understood that the number and the location of the optical decoupling zone 9 also called optical decoupling zone, may varied depending on the design of the housing or the detection device and/or the optical device.

Compared with separate optical covers, the use of one single optical cover with virtually separate optical apertures according to the present invention, presents advantages as described above.

Particularly in automotive field, the detection device according to the present invention as LiDAR for example, may be implemented/attached directly on automotive glazing or trim element or applique. As the optical cover may be extended outside the protective housing, the detection device may be attached to the glazing easily through its extended optical cover, the glazing may be a windshields, backlites, sidelites and sunroofs, where it is required to have one piece of glazing or plastic.

Thus, it is proposed to use the optical decoupling zone 9 as part of the optical cover to realize virtually separate optical apertures 51, 52. Depending on the design and requirement of the detection device 100, the optical decoupling zone 9 can be located at any place of the optical cover, and multiple optical decoupling zones 9 can also be used either to create multiple separate optical apertures 51, 52, or to improve the efficiency of reducing unexpected electromagnetic waves. Most of the times, the optical decoupling zone 9 is located at the interface between two separate optical apertures 51, 52.

It should be noted that for light rays in the following figures, it is only to demonstrate their final endings 6 (either extracted or absorbed), but not their complete optical paths (like multiple reflections, scattering and directions).

Figure 4:
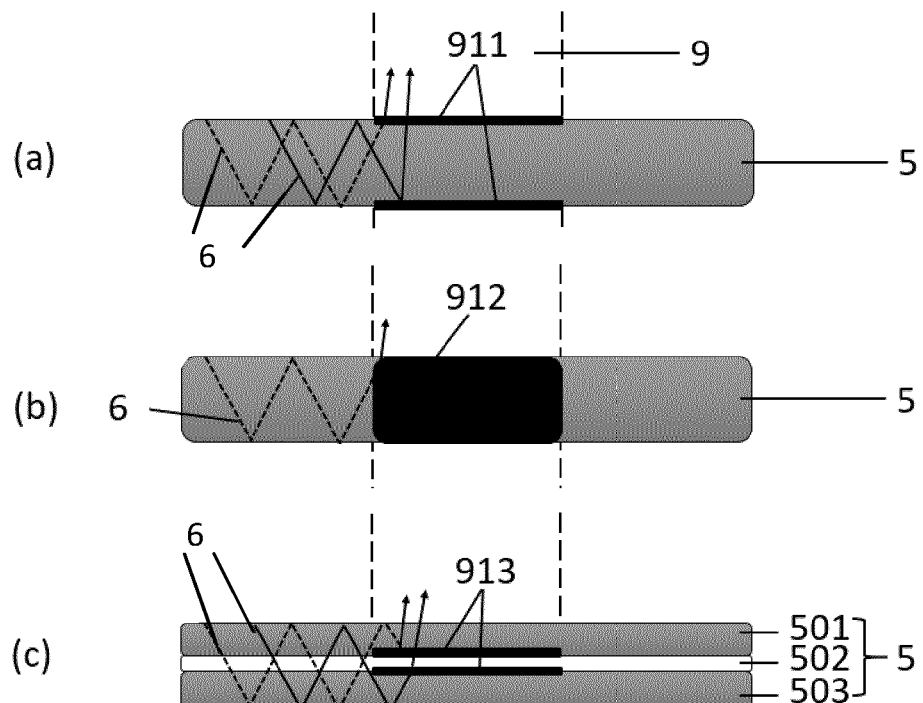
FIGS. 4a, 4b, 4c is a cross view of a detection device according to the present invention, with an optically transparent cover provided with a diffusing element.

In FIG. 4, diffusing elements are used as optical decoupling in the optical decoupling zone 9 between the at least the first and the second aperture 51, 52, outside the field of view (FOV) of the light source and the sensitive element in a way to avoid the stray light travelling from the light source 1 to the sensitive element 2 within the optical cover 5. Diffusing elements diffuse or scatter unexpected electromagnetic waves 6 to other directions, so that they can finally be extracted from the optical cover 5. One or more diffusing element may be used alone or in combination with another diffusing element or absorbing element or multilayer, wavelength-changing elements.

According to the present invention, the optical cover 5 may be made of glass or plastic. More preferably, the optical cover is made of glass. In FIG. 4a, the diffusing elements 911 may be formed or attached additionally at one or both surfaces of the optical cover 5. These surface diffusing elements may include random surface microstructures, microstructure arrays, diffractive gratings, and so on.

Moreover, diffusing elements 912 as shown in FIG. 4b can be created inside the cover material 5, close to the surface or not. The diffusing elements may include air bubbles, chemical particles or any suitable material.

According to an embodiment of the present invention, the optical cover 5 may be a laminated glass sheets. As shown in FIG. 4c, the surface diffusing elements 913 may be formed within the optical cover 5, by locating them on either surface of the two glass sheets 501 and 503 in contact with the interlayer 502. The interlayer is used to laminate the two glass sheets together.

Surface diffusing elements 911 and 913 can be generated by different techniques, including acid etching, sand blasting, laser blasting, Ion implementation, optical lithography and so on. In glazing industry, it is also possible to create enamels diffusing patterns by enamel printing with dedicated silk screening. Material diffusing elements 912 can be created either during the fabrication process or afterwards as well.

In FIGS. 5a, b and c, the solution using absorbing elements is shown as optical decoupling element 921, 922, 923 in optical decoupling zone 9 between the apertures 51 and 52. Absorbing elements 921, 922, 923 are used to absorb unexpected electromagnetic waves.

The absorbing elements 921 as shown in FIG. 5a may be applied on the external surface of the optical cover 5. The surface absorbing elements 921 can be some separate elements attaching to the surface, like black silicone pad, or black enamels printed on one or both surfaces of the optical cover.

In case of laminated glass sheets or laminated plastic or laminated combination glass/plastic used as optical cover 5, as shown in FIG. 5b or FIG. 5c, the interlayer 502 at the optical decoupling zone 9 can be modified as an absorbing element 922. By using die cut technique at the separator zone 9, the original interlayer can be replaced by a second interlayer, which has a higher absorption at the wavelengths of the unexpected electromagnetic waves 6, as shown in FIG. 5b.

Taken the example of LiDAR placed behind an automotive glazing or a trim element or an applique as cover, PVB interlayer used to laminate the glazing can be replaced by another interlayer (like ITO or black PVB) highly absorptive to IR light of LiDAR in the area wherein the LiDAR is placed. Alternatively, the interlayer can be prepared with a printed pattern, to have the black printed PVB at the optical decoupling zone 9.

For optical covers using laminated glazing, the surface absorbing elements 923 (e.g. black enamels) as shown in FIG. 5c can also be located on either surface of the two glass sheets 501 and 503 in contact with the interlayer 502.

Figure 6:
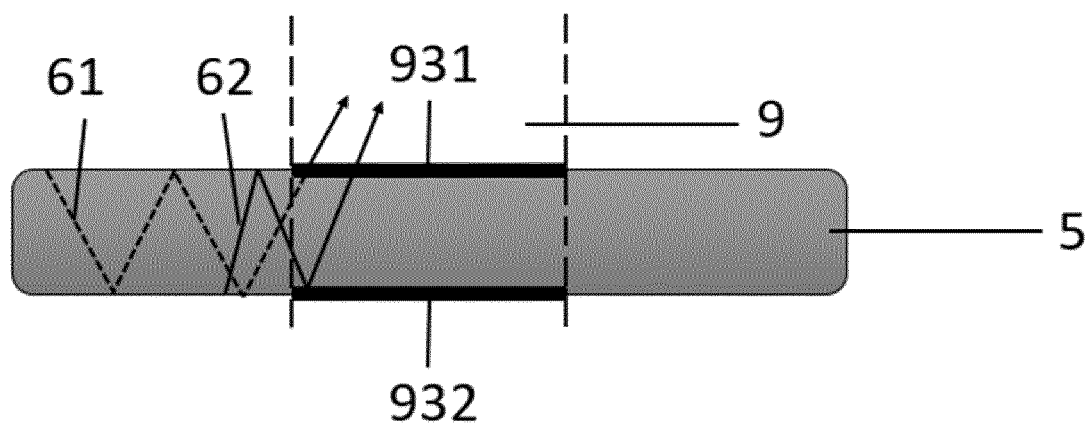
FIG. 6 is a cross view of a detection device according to the present invention, with an optically transparent cover provided with a multilayer element.

As shown in FIG. 6 as an embodiment of the present invention, multilayer elements may be used in the optical decoupling zone 9 between the two apertures 51 and 52 as optical decoupling element. The multilayer element may be an antireflective (AR) coating 931 is placed at the one surface of the optical cover to transmit light 61 externally. It is preferred to apply a highly reflective coating 932 at the opposite surface to reflect light 62 to the AR coated area to be finally extracted outside the optical cover 5. These multilayer coatings can be produced directly on the surface of the optical cover 5, or can be as additional elements attached to the optical cover 5.

The multilayer element and more particularly the AR coating may be applied by known coating techniques available, including Physical Vapor Deposition (PVD) methods (such as sputtering deposition, thermal vapor deposition), Chemical deposition methods (such as chemical reduction, pyrolytic coating like Chemical Vapor Deposition (CVD), sol-gel deposition), Plasma-Assisted Chemical Vapor Deposition (PACVD) . . . .

According to another embodiment of the present invention, wavelength-changing elements may be used as decoupling element provided between the at least the first and the second aperture 51 and 52 in the optical decoupling zone 9, outside the field of view (FOV) of the light source 1 and the light sensitive element 2 in a way to avoid the stray light travelling from the light source 1 to the light sensitive element 2 within the optical cover 5.

Figure 5:
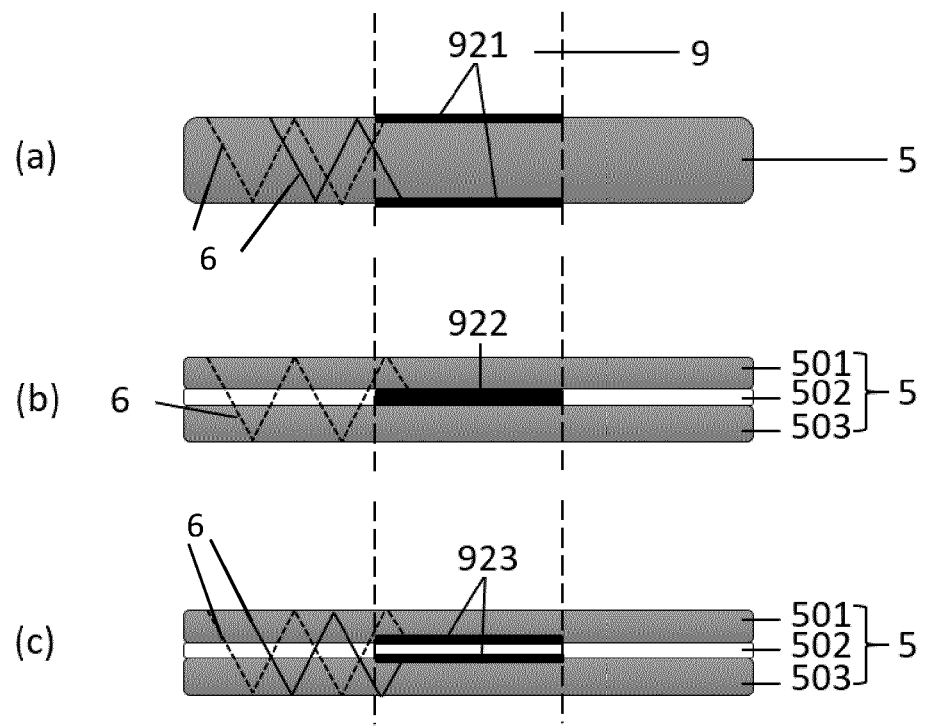
FIGS. 5a, 5b, 5c is a cross view of a detection device according to the present invention, with an optically transparent cover provided with an absorbing element.

The same configuration as show in FIG. 5 may be applied in case a wavelength-changing elements is used as optical decoupling element. Wavelength-changing elements absorb the wavelength of light that should be isolated between two optical apertures, and emit light with another wavelength, based on fluorescence, non-linear optical effect, and other effects. So that light with original wavelength is not influencing two separated apertures.

According to another embodiment of the present invention, the optical decoupling elements to obtain separate optical apertures on one single optical cover according to the present invention, may be used alone or in combination thereof. In the meantime, one element can offer combined functions. For example, black enamel patterns can both be absorbing and diffusing.

According to the present invention, the optical device is provided inside a protective housing 4. Its design may depend on the type of the optical device and the optical cover is placed in order to protect the optical device. The optical cover is transparent at the operating wavelength of the said optical device.

The invention claimed is:

1. A detection device comprising:
   a. an optical device comprising a light source and a light sensitive element which are optically decoupled inside the detection device, the optical device being a LIDAR sensing device,
   b. a protective housing enclosing the optical device, and comprising an optical cover having one internal surface facing the optical device and an external surface opposite to the internal surface,
      (i) the optical cover being transparent at an operating wavelength of the optical device, and
      (ii) the optical cover comprising at least 2-separate apertures, a first aperture facing the light source and a second aperture facing the light sensitive element;
   wherein the optical cover is made in one piece comprising diffusing, absorbing, multilayer elements, and/or wavelength-changing elements or a combination thereof, placed between the first and the second apertures in an optical decoupling zone outside a field of view of the light source and the sensitive element to avoid stray light travelling from the light source to the sensitive element within the optical cover.

2. The detection device according to claim 1, wherein the optical cover is comprised of a glass sheet.

3. The detection device according to claim 1, wherein the optical cover is comprised of a glass sheet having an absorption coefficient lower than 5 $m^{-1}$ in the wavelength range from 750 to 1650 nm.

4. The detection device according to claim 1, wherein the LIDAR sensing device is capable of scanning, rotating and 3D mapping.

5. The detection device according to claim 1, wherein the LIDAR sensing device is a solid state LiDAR device capable of 3D mapping, and emitting a laser beam at a wavelength ranging between 750 and 1650 nm.

6. The detection device according to claim 1, wherein the optical device is provided on the internal face of an automotive glazing.

7. The detection device according to claim 1, wherein the optical device is provided on the internal face of an automotive applique or trim element.

8. The detection device according to claim 1, wherein the diffusing element is selected from the group consisting of random surface microstructures, internal air bubbles, internal chemical particles, microstructure arrays, and diffractive gratings.

9. The detection device according to claim 1, wherein the absorbing element is a black enamel or an opaque thermoplastic interlayer.

10. The detection device according to claim 1, wherein the multilayer element is an anti-reflective coating.

11. The detection device according to claim 1, wherein the diffusing, absorbing, multilayer elements, and/or wavelength-changing elements or a combination thereof are provided on at least one surface of the optical cover or laminated with the optical cover or formed inside the optical cover.

12. The detection device according to claim 11, wherein the diffusing, absorbing, multilayer elements, and/or wavelength-changing elements are laminated with the optical cover or formed inside the optical cover.

13. An optical cover comprising:
- at least 2-separate apertures, a first aperture configured to face a light source and a second aperture configured to face a light sensitive element; and
- diffusing, absorbing, multilayer elements, and/or wavelength-changing elements, placed between the first and the second apertures in an optical decoupling zone, outside of a field of view of the light source and the light sensitive element to avoid stray light travelling from the light source to the light sensitive element within the optical cover,
- wherein the optical cover is made in one piece, the optical cover is transparent at an operating wavelength of the optical device, and the optical cover is configured to enclose a LIDAR sensing device.

14. A detection device comprising:
- a. an optical device comprising a light source and a light sensitive element which are optically decoupled inside the detection device,
- b. a protective housing enclosing the optical device, and comprising an optical cover having one internal surface facing the optical device and an external surface opposite to the internal surface,
  - (i) the optical cover being transparent at an operating wavelength of the optical device, and
  - (ii) the optical cover comprising at least 2-separate apertures, a first aperture facing the light source and a second aperture facing the light sensitive element;
- wherein the optical cover is made in one piece comprising diffusing, absorbing, multilayer elements, and/or wavelength-changing elements or a combination thereof, placed between the first and the second apertures in an optical decoupling zone outside a field of view of the light source and the sensitive element to avoid stray light travelling from the light source to the sensitive element within the optical cover, wherein the absorbing elements are applied on the external surface of the optical cover.

* * * * *